United States Patent [19]

Levy

[11] Patent Number: 5,113,327
[45] Date of Patent: May 12, 1992

[54] LIGHTED MAGNIFIER DEVICE

[76] Inventor: Robert Levy, 6 Glenhollow Dr., Apt. A14, Holtsville, N.Y. 11742

[21] Appl. No.: 718,800

[22] Filed: Jun. 21, 1991

[51] Int. Cl.⁵ ............................................. F21L 1/00
[52] U.S. Cl. ............................ 362/157; 362/58; 362/109; 362/253; 362/285
[58] Field of Search .................. 362/98, 99, 109, 136, 362/140, 141, 142, 103, 157, 253, 285, 287

[56] References Cited

U.S. PATENT DOCUMENTS

| | | | |
|---|---|---|---|
| 1,884,968 | 10/1932 | Bloch | 362/109 |
| 1,909,662 | 5/1933 | Conners | 362/109 |
| 2,185,149 | 12/1939 | Hallbauer | 362/136 |
| 3,381,120 | 4/1968 | Fleisher et al. | 362/136 |
| 3,500,034 | 3/1970 | Bissell | 362/58 |
| 3,934,578 | 1/1976 | Heine | 362/109 |
| 4,178,625 | 12/1979 | Schudel | 362/431 |
| 4,241,383 | 12/1980 | Shea | 362/136 |
| 5,027,261 | 6/1991 | Hudson, Jr. | 362/58 |

Primary Examiner—Richard R. Cole
Attorney, Agent, or Firm—Michael I. Kroll

[57] ABSTRACT

An improved lighted magnifier device is provided which consists of a housing and a mechanism within the housing, for producing a light source, so that light from the light source producing mechanism can be transmitted out from the housing. Another mechanism is adjustably mounted to the housing, for enlarging an image of an object being illuminated by the light from the light source producing mechanism.

7 Claims, 2 Drawing Sheets

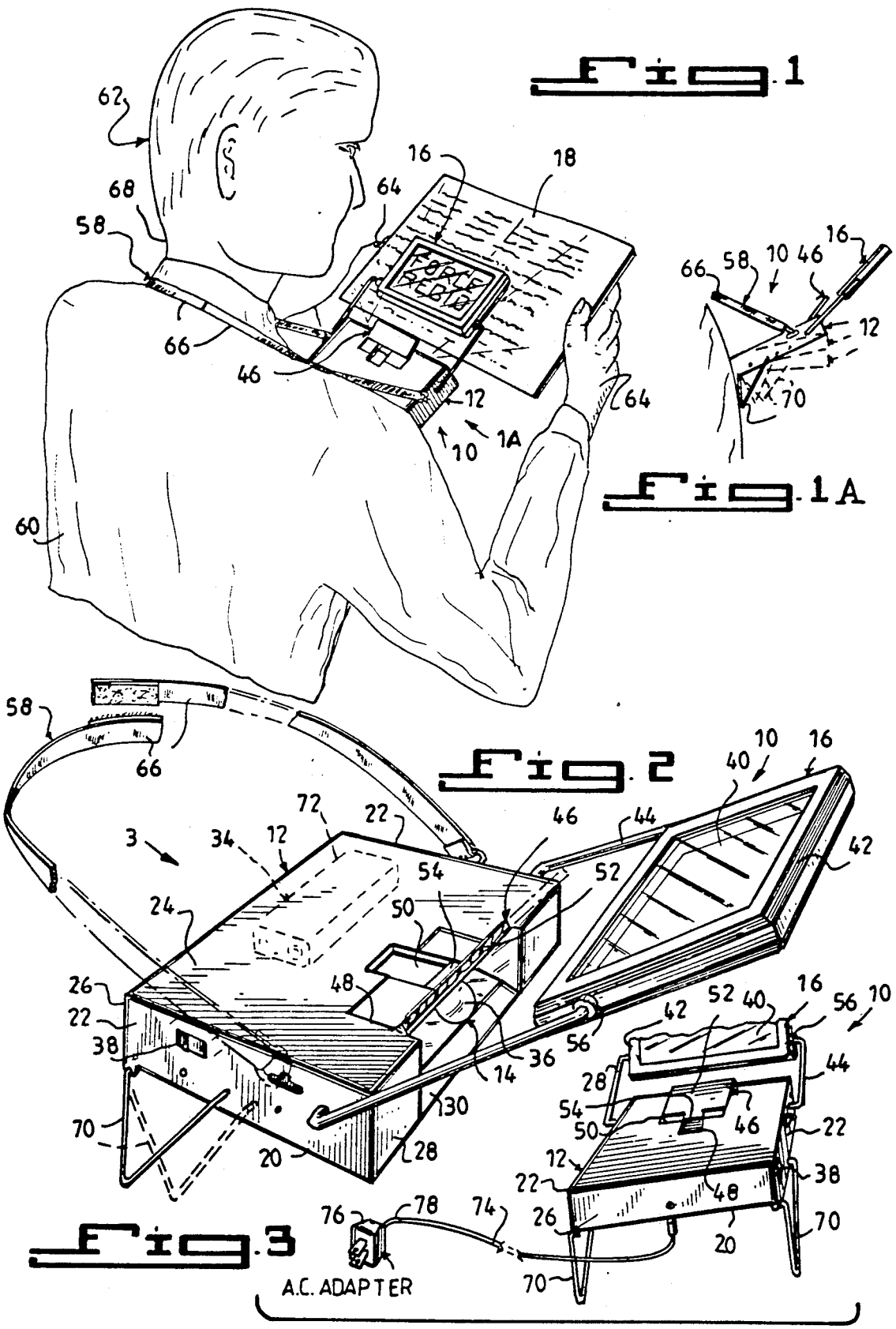

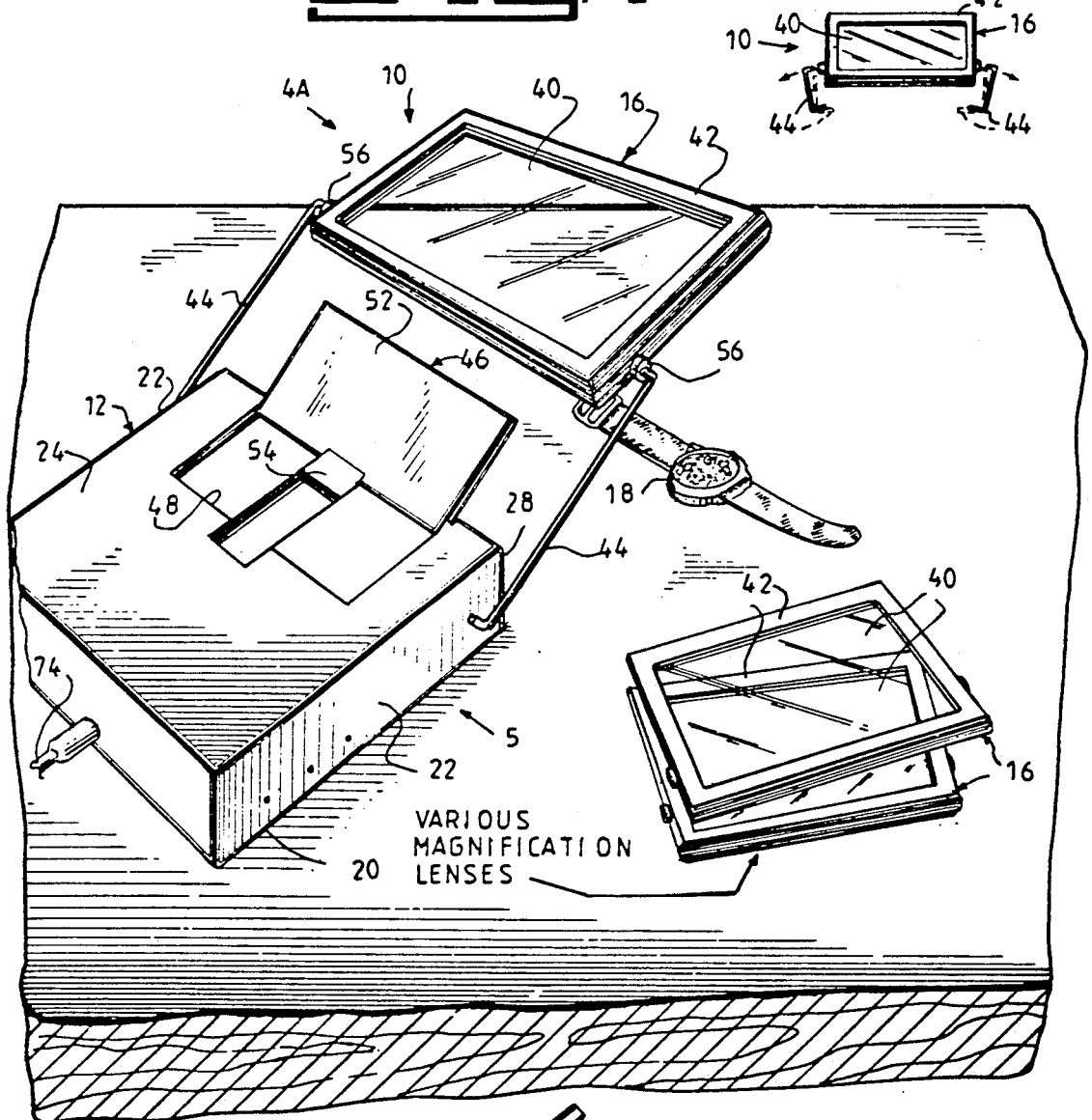

LIGHTED MAGNIFIER DEVICE

BACKGROUND OF THE INVENTION

1. Field of the Invention

The instant invention relates generally to magnifying apparatuses and more specifically it relates to an improved lighted magnifier device.

2. Description of the Prior Art

Numerous magnifying apparatuses have been provided in prior art that are adapted to enlarge images for viewing so that people can see them more clearly. While these units may be suitable for the particular purpose to which they address, they would not be as suitable for the purposes of the present invention as heretofore described.

SUMMARY OF THE INVENTION

A primary object of the present invention is to provide an improved lighted magnifier device that will overcome the shortcomings of the prior art devices.

Another object is to provide an improved lighted magnifier device which can be in one instance worn on the body of the user and in another instance be placed upon a flat surface so as to enlarge and illuminate various items to be better seen, especially for people with visual impairment.

An additional object is to provide an improved lighted magnifier device in which the magnifying lens can be replaced so that the magnification of the items can be enlarged and decreased as the need requires.

A further object is to provide an improved lighted magnifier device that is simple and easy to use.

A still further object is to provide an improved lighted magnifier device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention worn on the body of a user.

FIG. 1A is a side view taken in direction of arrow 1A in FIG. 1, with the strap broken away.

FIG. 2 is an enlarged perspective view of the instant invention with parts broken away.

FIG. 3 is a rear perspective view taken in direction of arrow 3 in FIG. 2, with the magnifying lens broken away.

FIG. 4 is a perspective view of the instant invention with parts broken away, used on a flat surface.

FIG. 4A is a top perspective view taken in direction of arrow 4A in FIG. 4, showing the magnifying lens being released from the arms.

FIG. 5 is an enlarged side view taken in direction of arrow 5 in FIG. 4, with parts broken away.

DETAILED DESCRIPTION OF THE PREFERRED EMBODIMENTS

Turning now descriptively to the drawings, in which similar reference characters denote similar elements throughout the several views, the Figures illustrate an improved lighted magnifier device 10 which consists of a housing 12, and a mechanism 14, within the housing for producing a light source, so that light from the light source producing mechanism 14 can be transmitted out from the housing 12. Another mechanism 16 is adjustably mounted to the housing, for enlarging an image of an object 18 being illuminated by the light from the light source producing mechanism 14.

The housing 12 is box shaped and includes a bottom wall 20, a pair of side walls 22, a top wall 24, a rear wall 26 and a front wall 28 having an aperture 30 therein. The light from the light source producing mechanism 16 within the housing 12, can be transmitted out through the aperture 30 in the front wall 28 of the housing 12.

The light source producing mechanism 14 includes a socket 32 carried within the housing 12 proximate the aperture 30 in the front wall 28 thereof. A power source 34 is carried within the housing an is electrically connected to the socket 32, while a light bulb 36 is mounted in the socket 32. The light bulb 36 is a halogen type light bulb. The light source producing mechanism 14 further includes a switch 38 mounted to the housing 12 and is electrically connected between the socket 32 and the power source 34, so that manual operation of the switch 38 can turn the light bulb 36 on and off when needed.

The image enlarging mechanism 16 includes a magnification lens 40 for enlarging the image of the object 18, a frame 42 in which the magnification lens 40 is mounted into and a pair of arms 44. Each arm 44 is pivotally mounted to one side of the frame 42 and the side wall 22 of the housing 12, so that the frame 42 with the magnification lens 40 can be adjustably positioned over the object 18 being illuminated.

The housing 12 further includes a mechanism 46 for angularly positioning the socket 32 with the light bulb 36 within the aperture 30 in the front wall 28 so that the light can be properly directed at the object 18 below the magnification lens 40.

The angularly positioning mechanism 46 includes the top wall 24 of the housing 12 having a recess 48 with a slide track 50 therein. A flip-up hood 52 is connected to the socket 32. The hood 52 has a guide member 54 so that the hood 52 can fit into the recess 48 while the guide member 54 can ride within the slide track 50 to angularly position the socket 32 with the light bulb 36.

Each arm 44 is flexible and is removably mounted to the one side of the frame 42 in a boss 56, so that the frame 42 can be removed and replaced with another frame 42 having a different sized magnification lens 4 therein. When the magnification lens 40 is changed the working distance will also be changed. The improved lighted magnifier device 10 can further include a mechanism 58, adjustably mounted to the housing 12, for enabling the device 10 to be worn on a body 60 of a user 62 of the device 10, thereby enabling the user 62 to freely utilize the hands 64.

The wearing enabling mechanism 58 includes an adjustable strap 66 extending from the side walls 22 of the housing 12 to be worn about the neck 68 of the user 62 and a pair of brackets 70. Each bracket 70 is adjustably mounted to one of the side wall 22 of the housing 12, to angular position and stabilize the housing 12 against the body 60 of the user 62.

The power source 34 is a battery 72. The power source 34 can further include an electric cord AC adaptor 74 extending from the housing 12. The electric cord 74 has a male plug 76 at its distal end 78 to connect to a wall socket (not shown).

The improved lighted magnifier device 10 can be worn on the user 62 as best shown in FIG. 1. The object 18 such as printed matter, can be held in the hands 64 of the user 64.

The improved lighted magnifier device 10 can be placed onto a flat surface 80, such as a table top or the like as shown in FIG. 4. The frame 40 with the magnification lens 42 can then be placed over the object 18, such as a watch or any other item to be viewed therefrom.

LIST OF REFERENCE NUMBERS 10 improved lighted magnifier device
12 housing
14 light source producing mechanism
16 image enlarging mechanism
18 object
20 bottom wall of 12
22 side wall of 12
24 top wall of 12
26 rear wall of 12
28 front wall of 12
30 aperture in 28
32 socket
34 power source
36 light bulb—halogen type
38 switch
40 magnification lens
42 frame
44 arm
46 angularly positioning mechanism
48 recess in 24
50 slide track in 48
52 flip-up hood
54 guide member on 52
56 boss in 42
58 wearing enabling mechanism
60 body
62 user
64 hands of 62
66 adjustable strap
68 neck of 62
70 bracket
72 battery for 34
74 electric cord AC adaptor
76 male plug
78 distal end of 74
80 flat surface It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and change in the forms and details of the device illustrated and in its operation can be made by those skilled in the art without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved lighted magnifier device which comprises:
   a housing, said housing is box shaped and includes a bottom wall, a pair of side walls, a top wall, a rear wall and a front wall having an aperture therein, so that light from a light source producing means within said housing can be transmitted out from said housing through the aperture in the front wall of said housing;
   b) said light source producing means includes a socket carried within said housing proximate the aperture in the front wall thereof, a power source carried within said housing, electrically connected to said socket, and a light bulb mounted in said socket, said light bulb is a halogen type light bulb, said light source producing means further includes a switch mounted to said housing electrically connected between said socket and said power source, so that manual operation of said switch can turn said light bulb on and off when needed; and
   c) means adjustably mounted to said housing, for enlarging an image of an object being illuminated by the light from said light source, said image enlarging means includes a magnification lens for enlarging the image of the object, a frame in which said magnification lens is mounted into, and a pair of arms, each pivotally mounted to one side of said frame and the side wall of said housing, so that said frame with said magnification lens can be adjustably positioned over the object being illuminated, wherein said housing further includes means for angularly positioning said socket with said light bulb within the aperture in the front wall, so that the light can be properly directed at the object below said magnification lens.

2. An improved lighted magnifier device as recited in claim 1, wherein said angularly positioning means includes:
   a) the top wall of said housing having a recess with a slide track therein; and
   b) a flip-up hood connected to said socket, said hood having a guide member so that said hood can fit into the recess while said guide member can ride within said slide track to angularly position said socket with said light bulb.

3. An improved lighted, magnifier device as recited in claim 2, wherein each said arm is flexible and removably mounted to the one side of said frame, so that said frame can be removed and replaced with another frame having a different sized magnification lens therein.

4. An improved lighted magnifier device as recited in claim 3, further including, means adjustably mounted to said housing for enabling said device to be worn on a body of a user of said device, thereby enabling the user to freely utilize his hands. lighted magnifier device 5. An improved lighted magnifier device as recited in claim 4, wherein said wearing enabling means includes:

a) an adjustable strap extending from the side walls of said housing to be worn about a neck of the user; and
b) a pair of brackets, each adjustably mounted to one of the side walls of said housing, to angularly position and stabilize said housing against the body of the user.

6. An improved lighted magnifier device as recited in claim 5, wherein said power source is a battery.

7. An improved lighted magnifier device as recited in claim 6, wherein said power source further includes an electric cord AC adaptor extending from said housing, said electric cord having a male plug at its distal end to connect to a wall socket.

* * * * *